United States Patent

Okazaki et al.

[11] Patent Number: 5,951,084
[45] Date of Patent: Sep. 14, 1999

[54] SEAT STRUCTURE FOR A VEHICLE

[75] Inventors: Hidetsugu Okazaki; Naohiro Takahashi, both of Wako, Japan

[73] Assignee: Honda Giken Kogyo Kabushiki Kaisha, Tokyo, Japan

[21] Appl. No.: 08/936,731

[22] Filed: Sep. 25, 1997

[30] Foreign Application Priority Data

Sep. 27, 1996 [JP] Japan ................................. 8-257043

[51] Int. Cl.⁶ ............................. B60N 2/12; B60R 7/04
[52] U.S. Cl. .................... 296/37.16; 296/64; 296/65.13; 296/65.16; 224/275; 297/188.21; 297/354.11; 297/411.21
[58] Field of Search ........................... 296/63, 64, 65.13, 296/65.16, 37.8, 37.14, 37.16; 224/275; 297/188.06, 188.21, 125, 378.12, 354.11, 411.21

[56] References Cited

U.S. PATENT DOCUMENTS

| 2,980,466 | 4/1961 | Barenyi | 296/63 |
|---|---|---|---|
| 4,266,704 | 5/1981 | Swanson | 224/275 |
| 5,611,589 | 3/1997 | Fujii et al. | 296/64 |

FOREIGN PATENT DOCUMENTS

| 556374 | 7/1923 | France | 297/378.1 |
|---|---|---|---|
| 363242751 | 10/1988 | Japan | 224/275 |
| 1-9706 | 3/1989 | Japan . | |
| 404024133 | 1/1992 | Japan | 224/275 |
| 404024135 | 1/1992 | Japan | 224/275 |
| 7-8060 | 2/1995 | Japan . | |

*Primary Examiner*—Dennis H. Pedder
*Attorney, Agent, or Firm*—Armstrong, Westerman, Hattori, McLeland and Naughton

[57] ABSTRACT

A seat structure for a vehicle includes a center seat that is slidable in the front-rear direction of the vehicle along a predetermined path extending through front and rear seat rows between respective left and right seats of the seat rows separated from each other transversely to the travelling direction of the vehicle. A console box is provided rearwardly of the center seat and slidable in the front-rear direction of the vehicle. The console box includes an armrest pivotable relative to the body of the box. The console box is located in an area defined by the left and right seats of the rear seat row when these seats are inclined rearward.

6 Claims, 8 Drawing Sheets

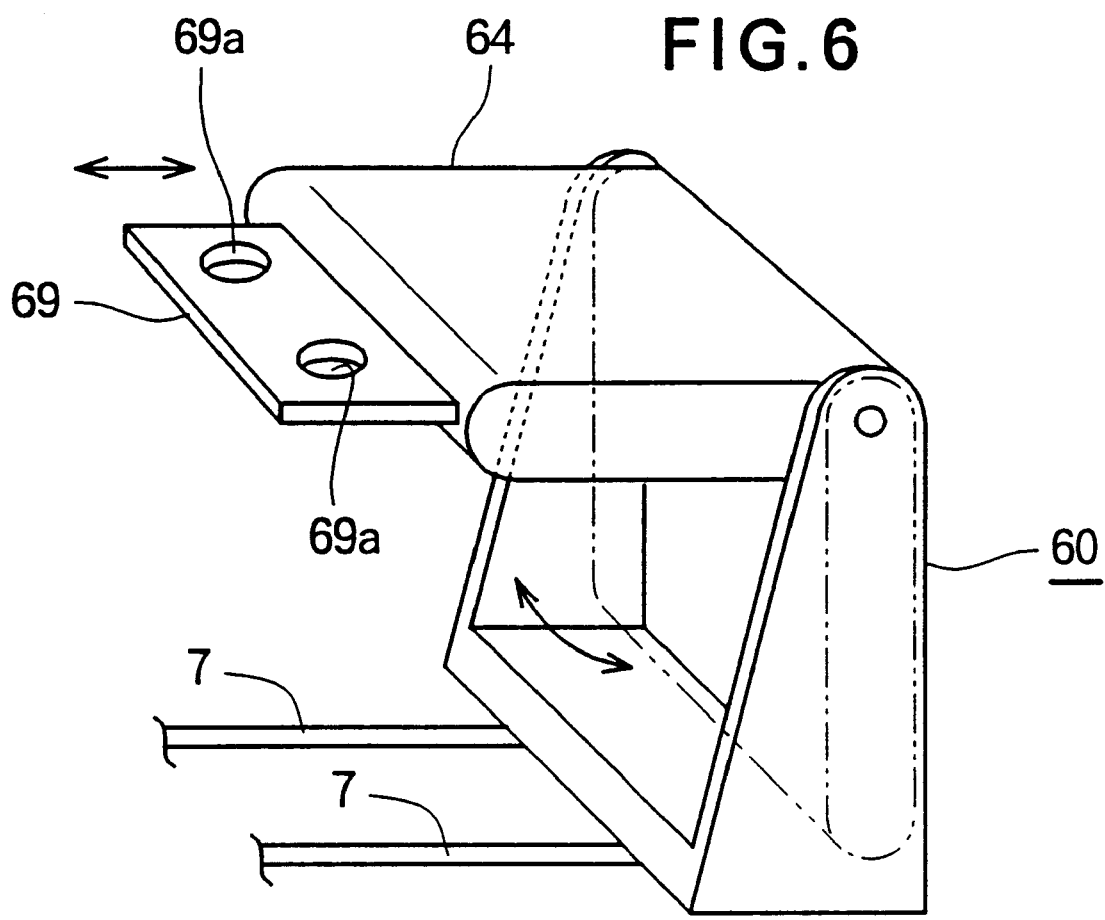

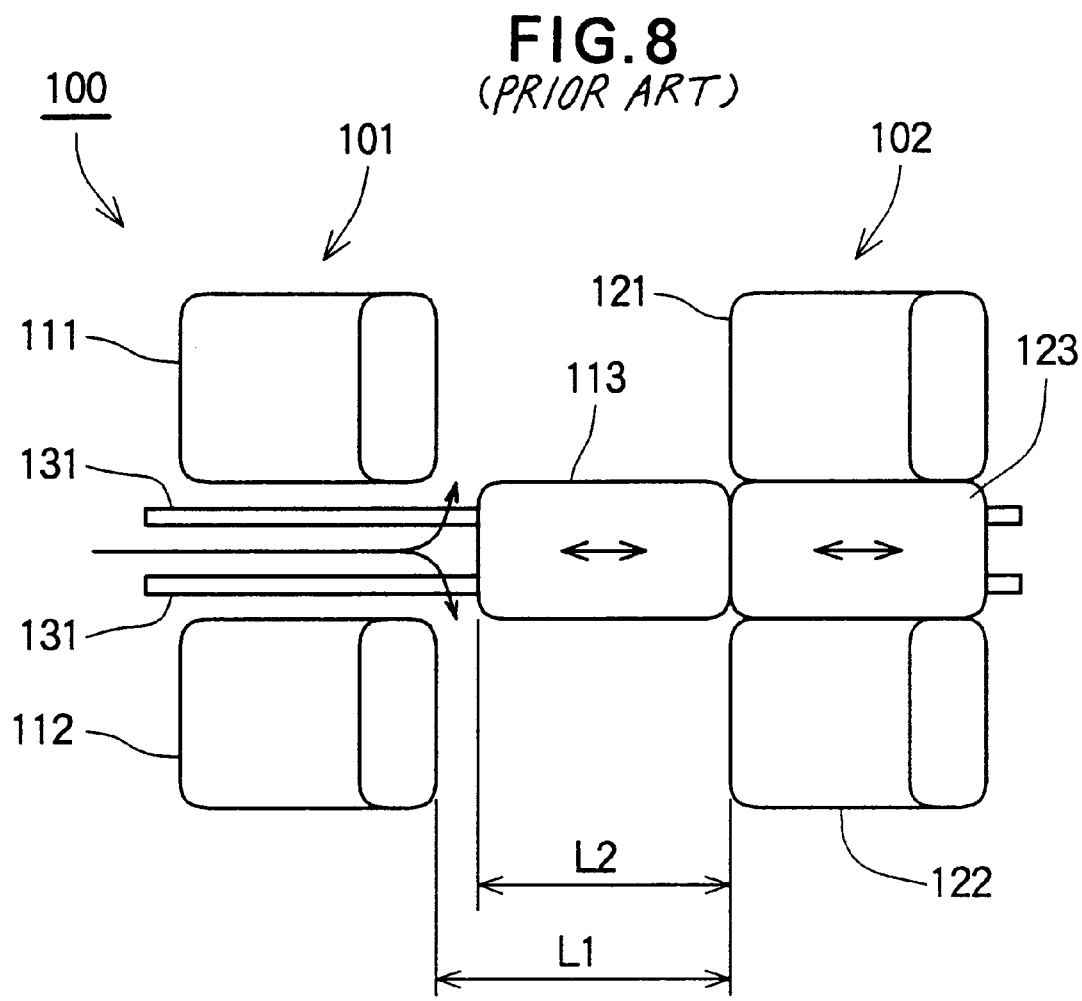

SEAT STRUCTURE FOR A VEHICLE

BACKGROUND OF THE INVENTION

1. Field of the Invention

The present invention relates to an improved seat structure for use in a vehicle.

2. Description of the Related Art

Various seat structures for vehicles (hereinafter "vehicle seat structures") are known from, for example, Japanese Utility Model Publication No. HEI-1-9706 and Japanese Utility Model Laid-open Publication No. HEI-7-8060.

FIG. 8 is a schematic plan view of the vehicle seat structure disclosed in the above-mentioned No. HEI-1-9706 publication, and this seat structure 100 includes front and rear seat rows 101 and 102. The front seat row 101 consists of a pair of right and left seats 111 and 112 separated from each other transversely to the travelling direction (leftward in the figure) of the vehicle, and a front center seat 113 movable in the vehicle travelling direction between the right and left seats 111 and 112. Similarly, the rear seat row 102 consists of a pair of right and left seats 121 and 122 separated from each other transversely to the vehicle travelling direction, and a rear center seat 123 movable in the vehicle travelling direction between the right and left seats 121 and 122. Reference numeral 131 denotes a pair of parallel rails constituting a predetermined linear path along which the front and rear center seats 113 and 123 are moved in the vehicle travelling direction. Further, reference numeral L1 denotes a distance between the front and rear seat rows 101 and 102, and L2 denotes a length of the front center seat 113 in the front-rear direction of the vehicle.

With the vehicle seat structure disclosed in the HEI-1-9706 publication, a person cannot freely move or walk across the region between the front and rear seat rows 101 and 102 (that is, a so-called "walk-through" is difficult) unless the distance L1 therebetween is set to be greater than the length L2 of the front center seat 113. To permit an easy "walk-through" in the region between the front and rear seat rows 101 and 102, the vehicle seat structure disclosed in the No. HEI-1-9706 publication is designed in such a manner that the distance L1 between the front and rear row seats 101 and 102 is sufficiently greater than the length L2 of the front center seat 113.

However, the disclosed vehicle seat structure presents a very poor space efficiency because the front and rear center seats 113 and 123 of relatively large size are disposed in a limited space within the vehicle while making it necessary to provide the sufficient distance L1. The sufficient distance L1 would inevitably lead to an increased overall length of the vehicle.

The vehicle seat structure disclosed in the No. HEI-7-8060 laid-open publication includes first, second and third seat rows and the third seat row consists of right, left and center seats. Here, the center seat in the third seat row is slidable to between right and left seats of the second seat row to permit a walk-through. In this case, when the center seat is used in conjunction with one of the second and third seat rows, an empty opening or gap is formed between right and left seats in the other of the second and third seat rows. This empty opening would cause various inconveniences; for example, some object would fall into this opening. That is, when the second or third seat row is used as seats for two persons, this seat row would considerably impair the convenience and dwelling comfort of the vehicle due to lack of the center seat that may function as an armrest or table.

SUMMARY OF THE INVENTION

According to a primary aspect of the present invention, there is provided a seat structure for a vehicle, which comprises: at least a pair of front and rear seat rows spaced apart from each other in a front-rear direction of the vehicle, each of the front and rear seat rows including left and right seats separated from each other transversely to a travelling direction of the vehicle; a center seat slidable in the front-rear direction of the vehicle along a predetermined path extending through the front and rear seat rows between the left and right seats; and a console box provided rearwardly of the center seat and including a pivotally retractable armrest, the console box being slidable in the front-rear direction of the vehicle. In this seat structure, the console box is located in an area formed by the left and right seats of the rear seat row when these left and right seats of the rear seat row are inclined rearward.

When the center seat is positioned between the left and right seats of the front seat row, the console box can be advanced to between the left and right seats of the rear seat row and used as an armrest or cup holder. The convenience and dwelling comfort of the vehicle can be improved because no gap is formed between the left and right seats of the rear seat row. Further, by setting the armrest of the console box to the upright or raised position for a reduced dimension in the front-rear direction of the vehicle, the center seat can be moved to be placed snugly between and in substantial alignment with the left and right seats of the rear seat row to thereby provide a bench seat for three persons. This arrangement also permits an easy walk-through without requiring an increased distance between the front and rear seat rows, thereby greatly improving the convenience, dwelling comfort and space efficiency of the vehicle.

BRIEF DESCRIPTION OF THE DRAWINGS

Preferred embodiments of the present invention will be described hereinbelow, by way of example only, with reference to the accompanying drawings, in which:

FIG. 6 is a schematic perspective view of a modification of the console box;

FIG. 8 is a schematic plan view of a conventionally-known vehicle seat structure.

DETAILED DESCRIPTION OF THE PREFERRED EMBODIMENTS

The following description is merely exemplary in nature and is in no way intended to limit the invention or its application or uses. In the following description, the terms, "front", "rear", "left", "right", "upper" and "lower," denote respective directions as viewed from a vehicle operator or driver in the vehicle travelling direction.

Figure 1:
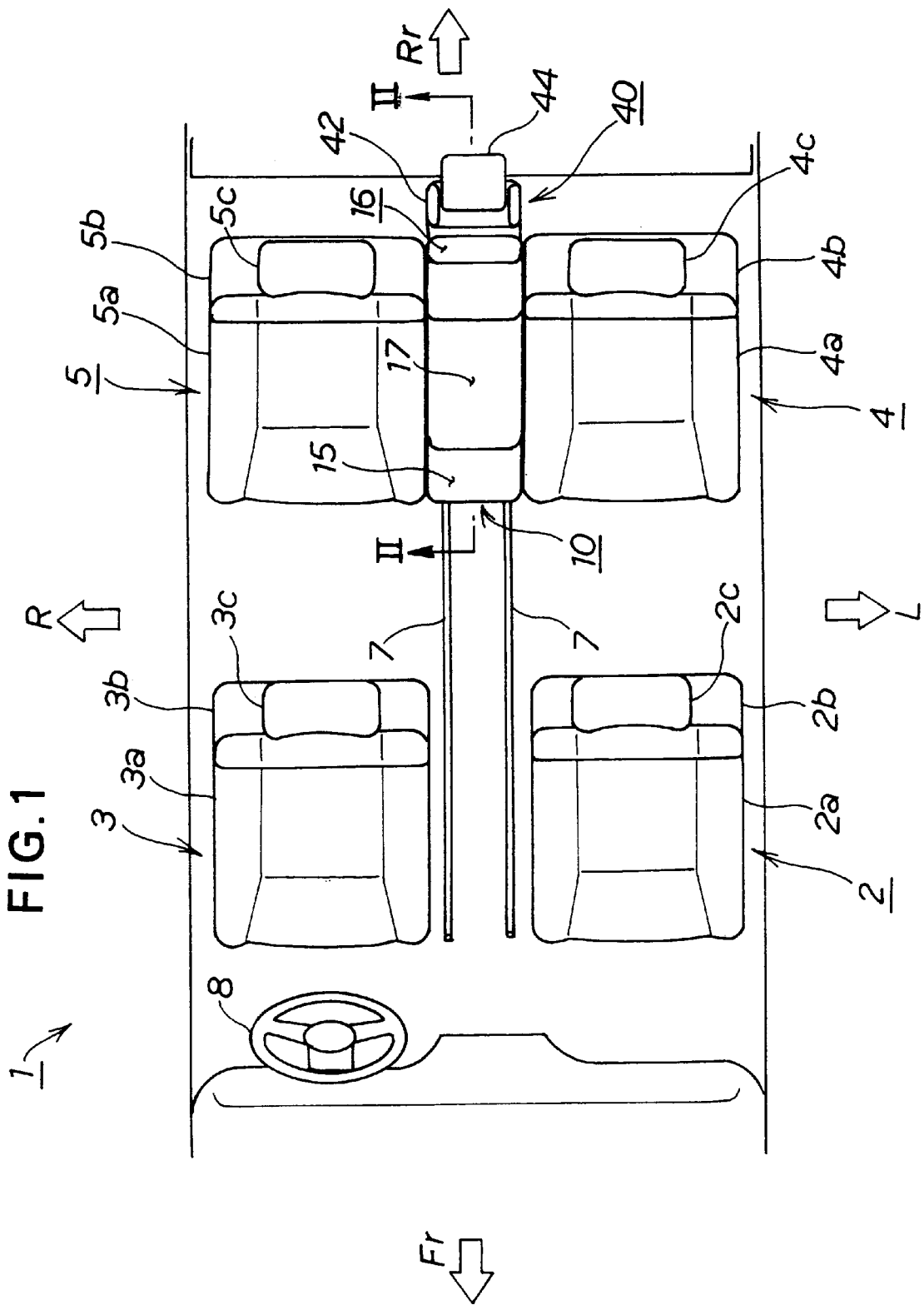
FIG. 1 is a schematic plan view of a vehicle seat structure according to a preferred embodiment of the present invention.

FIG. 1 is a schematic plan view of a vehicle seat structure 1 according to a preferred embodiment of the present invention, which comprises a front left seat 2, a front right seat 3 for the vehicle driver, a rear left seat 4 and a rear right seat 5. Two parallel rails 7 are disposed through the front and rear seat rows between the left seats 2, 4 and the right seats 3, 5, and a center seat 10 is provided for sliding movement on and along the rails 7. Console box 40 is provided, rearwardly of the center seat 10, for sliding movement on and along the rails 7. Reference numeral 8 denotes a steering wheel.

The front left seat 2 includes a seat part 2a, a back 2b pivotably attached to the seat part 2a, and a headrest 2c attached to the top of the back 2b for vertical movement relative thereto. The front right seat 3, rear left seat 4 and rear right seat 5 are constructed similarly to the front left seat 2; reference numerals 3a, 4a and 5a denote their respective seat parts, 3b, 4b and 5b denote their respective backs, and 3c, 4c and 5c denote their respective headrests.

Figure 2:
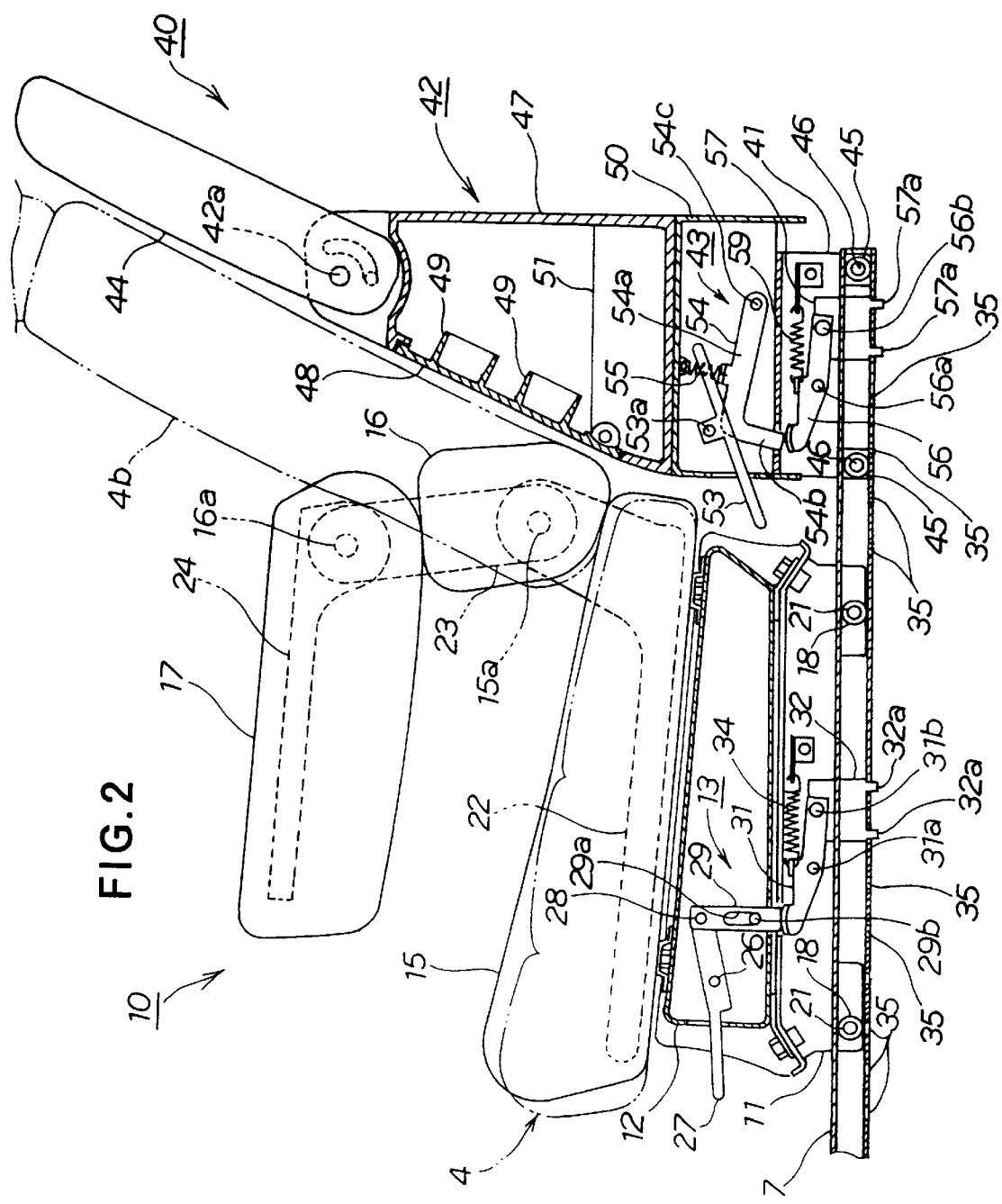
FIG. 2 is a sectional view, in enlarged scale, of the vehicle seat structure taken along the line II—II of FIG. 1.

FIG. 2 is a sectional view showing a center-seat supporting structure and a console box. As shown, the center seat 10 includes a base member 11 movable on and along the rails 7, a stay member 12 secured to the base member 12, and a center-seat locking mechanism 13 incorporated in the stay and base members 12 and 11. The center seat 10 also includes a seat part 15 fixedly mounted on the stay member 12, a lower back portion 16 attached to the seat part 15 for pivotal movement relative thereto in the front-rear direction, and an upper back portion 17 attached to the lower back portion 16 for pivotal movement relative thereto in the front-rear direction.

The base member 11 includes rollers 18 rollingly movable on the rails 7, and each of the rollers 18 is rotatably mounted on a shaft 21. The seat part 15, lower back portion 16 and upper back portion 17 include support frames 22, 23 and 24, respectively. Reference numeral 15a denotes a pivot axis of the lower back portion 16, and 16a denotes a pivot axis of the upper back portion 17.

The center-seat locking mechanism 13 includes an operating lever 27 for positioning the center seat 10 at a desired position on the rails 7. The operating lever 27 is pivotably attached to the stay member 12 via a connection pin 26. The operating lever 27 is connected at its rear end to the proximal or upper end of a pusher member 29 via a pin 28, and the pusher member 29 has an elongated aperture formed therein and extending in the longitudinal direction thereof. Pin 29b secured to the stay member 12 vertically movably fits in the elongated aperture 29a so that the pusher member 29 is allowed to move vertically within the range of the aperture 29a. The distal or lower end of the pusher member 29 abuts against the distal or front end of a generally horizontal seesaw lever 31, which is pivotably connected to the base member 11 via an axis 31a provided on the base member 11.

Stopper member 32 is attached to the distal or rear end of the seesaw lever 31 via a pin 32 in such a manner that the pivotal movement of the seesaw lever 31 causes the stopper member 32 to move upward or downward. The stopper member 32 has, at its lower end, a pair of spaced-apart downward projections 32a. Return spring 34 in the form of a tension spring is provided between the base member 11 and the seesaw lever 31, so as to normally bias the seesaw lever 31 in a direction to rotate clockwise about the axis 31a.

A plurality of stopper holes 35 are formed in at least one of the rails 7 so that the projections 32a of the stopper member 32 are selectively fitted in two of the holes 35. By the fitting engagement of the projections 32a with the holes 35, the center seat 10 can be properly positioned and locked at a desired location on the rail 7.

As the operating lever 27 is pulled upward in the center-seat locking mechanism 13, the pusher member 29 is pushed downward to depress the distal or front end portion of the seesaw lever 31. Thus, the stopper member 32 connected to the proximal or rear end of the seesaw lever 31 is caused to move upward so that the projections 32a are raised out of the engagement with the stopper holes 35, which releases the center seat 10 from the locking by the rail 7. In the unlocked condition, the center seat 10 is allowed to freely slide along the rails 7.

When the operating lever 27 is released after the center seat 10 has been moved to a desired location on the rail 7, the stopper member 32 is pushed downward by the biasing force of the return spring 34 and thus the projections 32a are brought into fitting engagement with the stopper holes 35. As a result, the center seat 10 is again locked against movement relative to the rail 7.

As best seen in FIG. 2, the console box 40 includes a base member 41 movable on and along the rails 7, a stay member 50 fixedly mounted on the base member 41, and a console body 42 fixed mounted on the stay member 50. The console box 40 also includes a console locking mechanism 43 incorporated in the base member 41 and stay member 50, and an armrest 44 pivotably attached to the console body 42 via a pin 42a. The armrest 44 is maintained in the horizontal position by being pivoted in the forward direction. Similarly to the above-mentioned base member 11 of the center seat 10, the base member 41 includes rollers 45 rollingly movable on the rails 7, and each of the rollers 45 is rotatably mounted on a shaft 46.

The console body 42 includes a housing 47, a console door 48 provided on a surface of the housing 47 facing the center seat 10, cup holders 49 provided on the interior surface of the console door 48, and a receptacle portion 51 provided within the housing 47.

The console locking mechanism 43 includes an operating lever 53 for positioning the console box 40 at a desired position on the rails 7. The operating lever 53 is pivotably attached to the stay member 50 via a connection pin 53a. L-shaped lever 54 having a leg portion 54a and a foot portion 54b is pivotably connected, at the proximal or rear end of the leg portion 54a, to the stay member 54 via a pin 54c. Coil spring 55 is provided between the stay member 12 and the leg portion 54a of the L-shaped lever 54 and normally biases the foot portion 54b in the upward direction. The distal or lower end of the foot portion 54b of the L-shaped lever 54 abuts against the distal or front end of a seesaw lever 56, which is pivotably connected to the base member 41 via an axis 56a provided on the base member 41.

Stopper member 57 is attached to the distal or rear end of the seesaw lever 56 via a pin 56b in such a manner that the pivotal movement of the seesaw lever 56 causes the stopper member 57 to move upward or downward. The stopper member 57 has, at its lower end, a pair of spaced-apart downward projections 57a. Return spring 59 in the form of a tension spring is provided between the base member 41 and the seesaw lever 56, so as to normally bias the seesaw lever 56 in a direction to rotate clockwise about the axis 56a.

The stopper member 57 is shaped similarly to the above-mentioned stopper member 32 of the center seat locking mechanism 13. The fitting engagement of the projections 57a with the stopper holes 35 formed in at least one of the rails 7 permits the console box 40 to be properly positioned and locked at a desired location on the rail 7.

As the operating lever 53 is pulled upward in the console locking mechanism 43, the foot portion 54b of the L-shaped lever 54 is pushed downward to depress the distal or front end portion of the seesaw lever 56. Thus, the seesaw lever 56 is pivoted counterclockwise about the axis 56a, so that the proximal or rear end of the seesaw lever 56 is caused to move upward so that the stopper member 57 also moves upward. As a result, the projections 57a are raised out of the engagement with the stopper holes 35 of the rail 7, which releases the console box 40 from the locking by the rail 7. In the unlocked condition, the console box 40 is allowed to freely slide along the rails 7.

When the operating lever 53 is released after the console box 40 has been moved to a desired location on the rail 7, the seesaw lever 56 is pivoted clockwise about the axis 56a by the biasing forbiasing force of the return spring 59, so that the stopper member 57 is pushed downward and thus the projections 57a are brought into fitting engagement with the stopper holes 35. As a result, the console box 40 is again locked against movement relative to the rail 7. Note that the rails 7 extend rearward beyond the rear seat row.

Characteristic operation of the above-mentioned vehicle seat structure 1 will now be described.

Figure 3A:
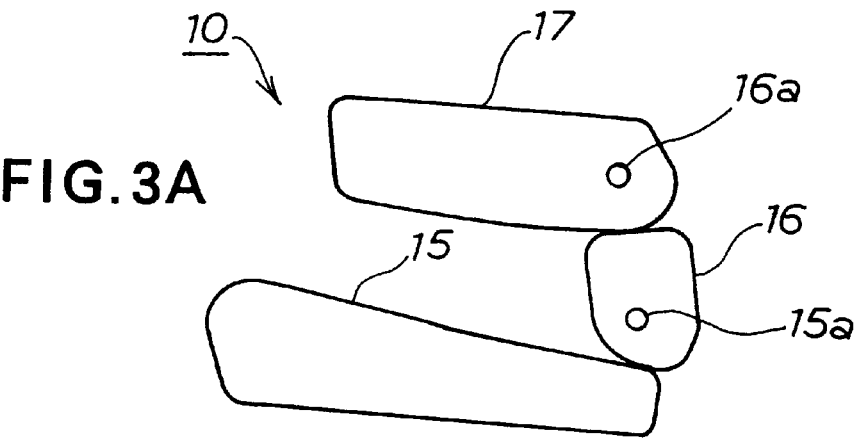
FIGS. 3A and 3B are views showing a manner in which a center seat of FIG. 1 operates in the preferred embodiment.
Figure 3B:
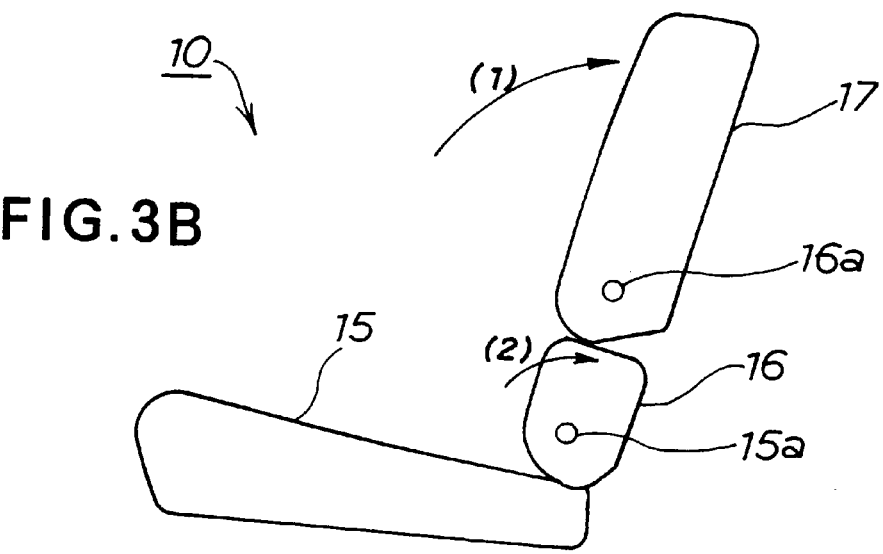

FIGS. 3A and 3B show a manner in which the center seat of FIG. 1 operates in the preferred embodiment. Specifically, in FIG. 3A, the lower and upper back portions 16 and 17 of the center seat 10 are shown as pivoted forward in such a manner that the seat part 15 and lower and upper back portions 16 and 17 together constitute a channel shape. The upper back portion 17 in the forwardly pivoted position can be used as a pivotally retractable armrest or table. FIG. 3B shows the lower and upper back portions 16 and 17 set in the upright or raised position as indicated by arrows (1) and (2), respectively, to provide the primary function of the vehicle seat.

Figure 4A:
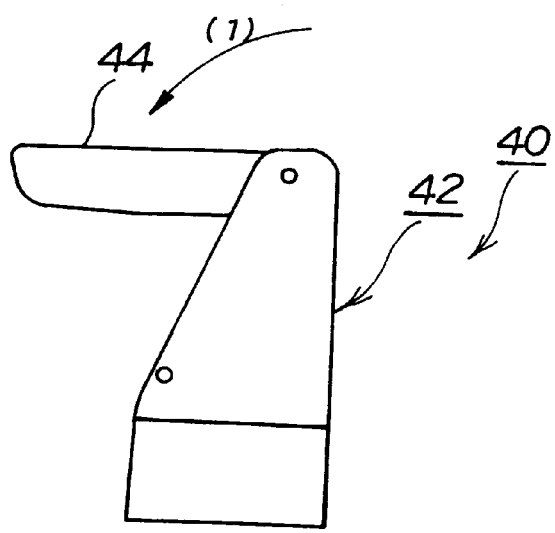
FIGS. 4A and 4B are views showing a manner in which a console box of FIG. 1 operates in the preferred embodiment.
Figure 4B:
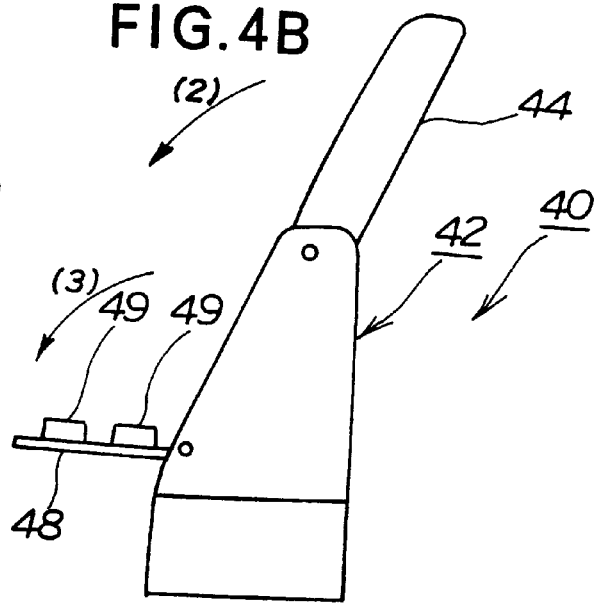

FIGS. 4A and 4B show a manner in which the console box 40 operates in the preferred embodiment. Specifically, FIG. 4A shows the armrest 44 of the console box 40 pivoted forward to the horizontal position as indicated by arrow (1). FIG. 4B shows the armrest 44 of the console box 40 set in the upright or raised position as indicated by arrow (2) and the console door 48 pivoted forward to the horizontal open position as indicated by arrow (3), and FIG. 4B also shows how the cup holders 49 provided on the interior surface of the console door 48 are used.

Figure 5A:
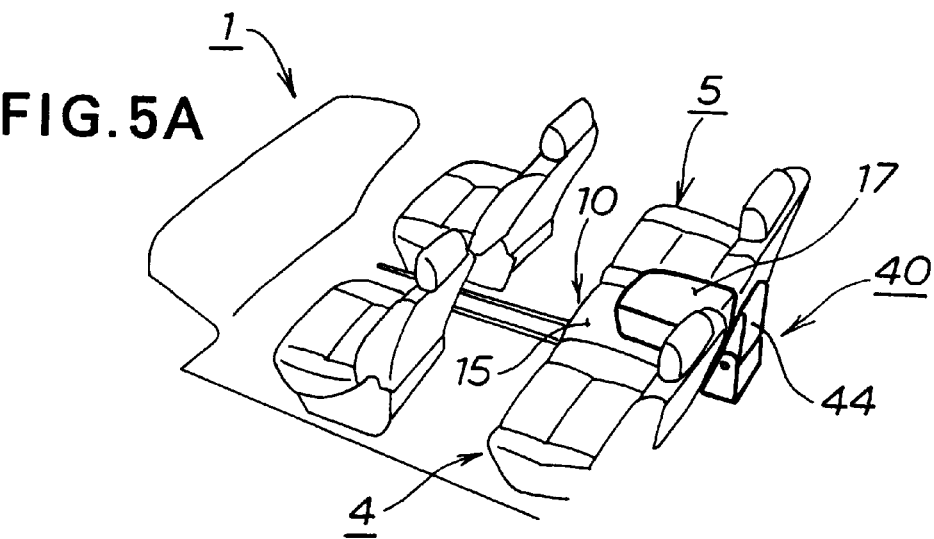
FIGS. 5A to 5F are views explanatory of characteristic operation of the vehicle seat structure according to the preferred embodiment of the present invention.

FIGS. 5A to 5F are views explanatory of characteristic operation of the vehicle seat structure 1 according to the preferred embodiment. Specifically, FIG. 5A shows a case where the center seat 10 is positioned between the rear left seat 4 and the rear right seat 5 and the upper back portion 17 of the center seat 10 is pivoted forward for use as a pivotally retractable armrest. Also, the console box 40 is located rearwardly of the center seat 10 with the armrest 44 placed in the raised position. In this case, the use of the center seat 10 is not obstructed since the console box 40 is located rearwardly of the rear left and right seats 4 and 5 away from the center seat 10 and the armrest 44 is in the raised position.

Figure 5B:
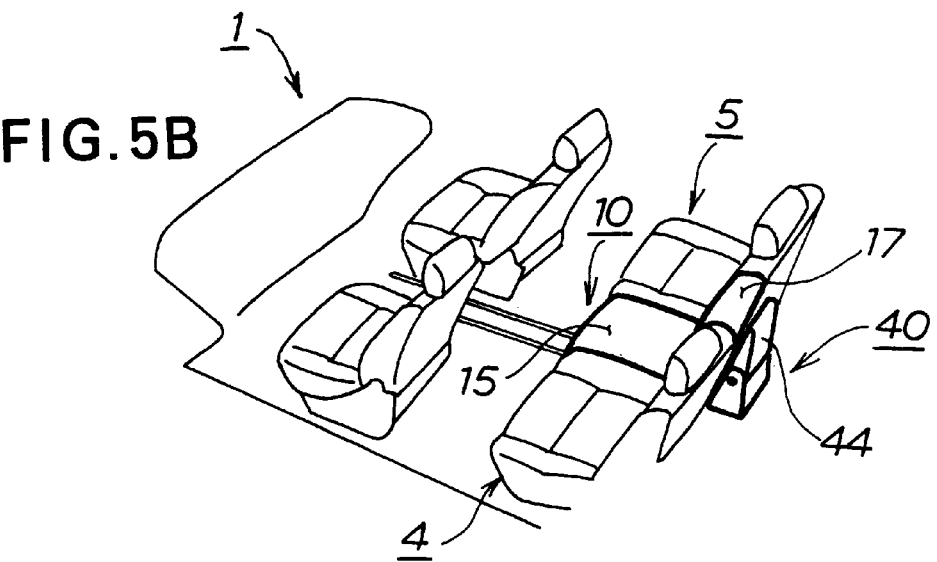

In FIG. 5B, the upper back portion 17 of the center seat 10 has been pivoted, from the position of FIG. 5A, upward to the raised position, and the rear left and right seats 4 and 5 and center seat 10 together constitute a bench seat.

Figure 5C:
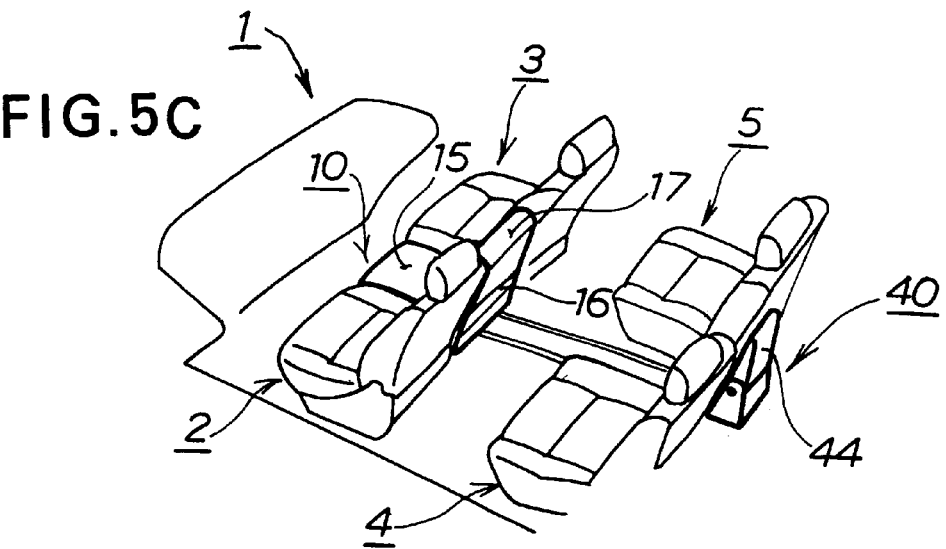

In FIG. 5C, the center seat 10 has been moved from between the rear left and right seats 4 and 5 to between the front left and right seats 2 and 3 so that the front left and right seats 2 and 3 and center seat 10 together constitute a bench seat. In this case, it is desirable that the console box 40 be used in the following manner because an empty opening or gap is formed between the rear left and right seats 4 and 5.

Figure 5D:
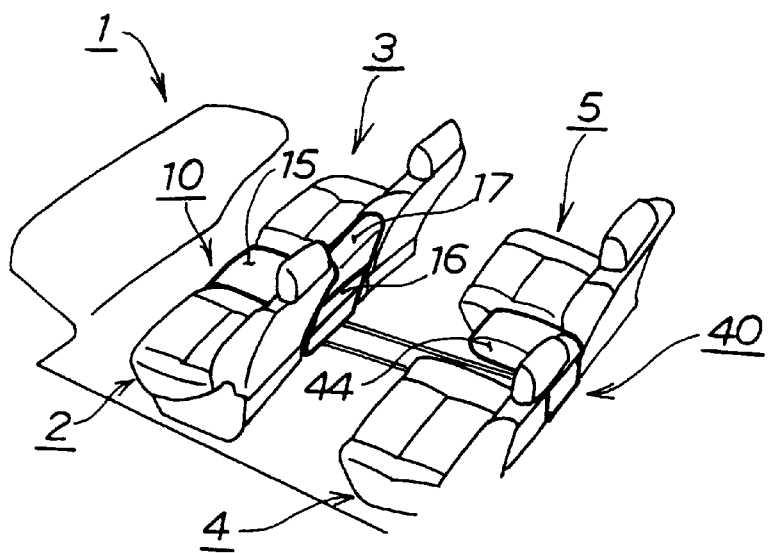

In FIG. 5D, the front left and right seats 2 and 3 and center seat 10 together constitute a bench seat, the console box 40 has been moved to between the rear left and right seats 4 and 5, and the armrest 44 has been pivoted forward to the horizontal position so as to close the gap. In this manner, the rear left and right seats 4 and 5 can be conveniently used because the console box 40 provided with the armrest 44 can be moved to and used between the rear left and right seats 4 and 5.

Figure 5E:
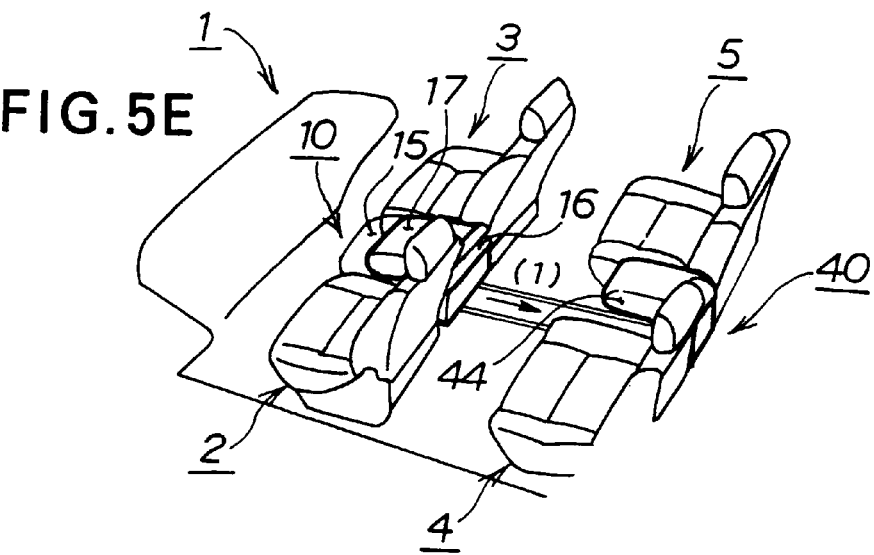
Figure 5F:
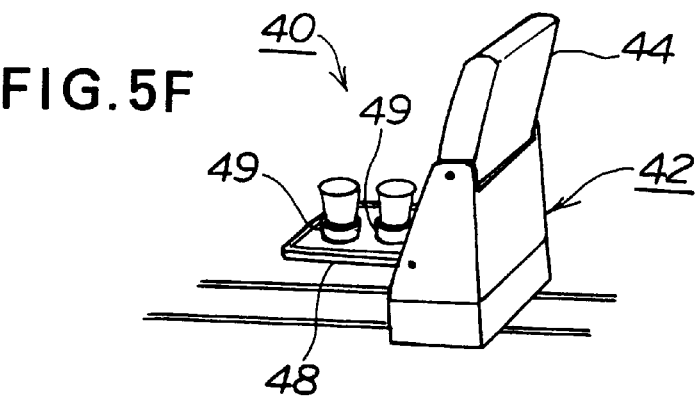

In FIG. 5E, the upper back portion 17 of the center seat 10 has been pivoted forward from the position of FIG. 5D to the horizontal position so as to function as a pivotally retractable armrest between the front left and right seats 2 and 3. The upper back portion 17 of the center seat 10 can also function as a table by moving the center seat 10 rearward to between the front seat row (seats 2, 3) and the rear seat row (seats 4, 5) as indicated by arrow (1). Finally, FIG. 5F shows the console door 48 of the console box 40 pivoted forward to the horizontal open position to permit use of the cup holders 49 provided on the interior surface of the door 48.

As set forth above, the vehicle seat structure 1 according to the preferred embodiment is arranged to allow the center seat 10 to be freely moved from the front seat row to the rear seat row and vice versa. This arrangement provides for a variety of seat combinations that would be suitably used for various cases, such as where two persons are seated on each of the seat rows, where three persons are seated on the front seat row with two persons seated on the rear seat row and where two persons are seated on the front seat row with three persons seated on the rear seat row.

In the case where two persons are seated on the front seat row, the center seat 10 can be transformed for use as an retractable armrest or table. In the case where two persons are seated on the rear seat row, the console box 40 can be used as an armrest or cup holder unit. As a result, this vehicle seat structure 1 provides for an increased space efficiency in the vehicle, thereby improving the convenience, dwelling comfort and space efficiency of the vehicle.

Further, by setting the armrest 44 of the console box 40 to the raised position for a reduced dimension in the front-rear direction of the vehicle, the center seat 10 can be moved to be placed snugly between, and in substantial alignment with, the rear left and right seats 4 and 5 to thereby provide a bench seat for three people. This arrangement also permits a walk-through without requiring an increased distance between the front and rear seat rows, thereby improving the convenience, dwelling comfort and space efficiency of the vehicle.

FIG. 6 is a schematic perspective view of a modification of the console box. This modified console box 60 includes a base member 61 movable on and along the rails 7, an armrest 64 pivotably attached to the base member 61, and a cup holder plate 69 attached to the armrest 64 for movement into and out of the armrest 64. The cup holder plate 69 has cup holding means 69a, which in this example are cup holding holes. When there is no need to use the cup holder plate 69 and armrest 64, the cup holder plate 69 can be retracted into the armrest 64 and the armrest 64 can be received within the base member 61.

Figure 7A:
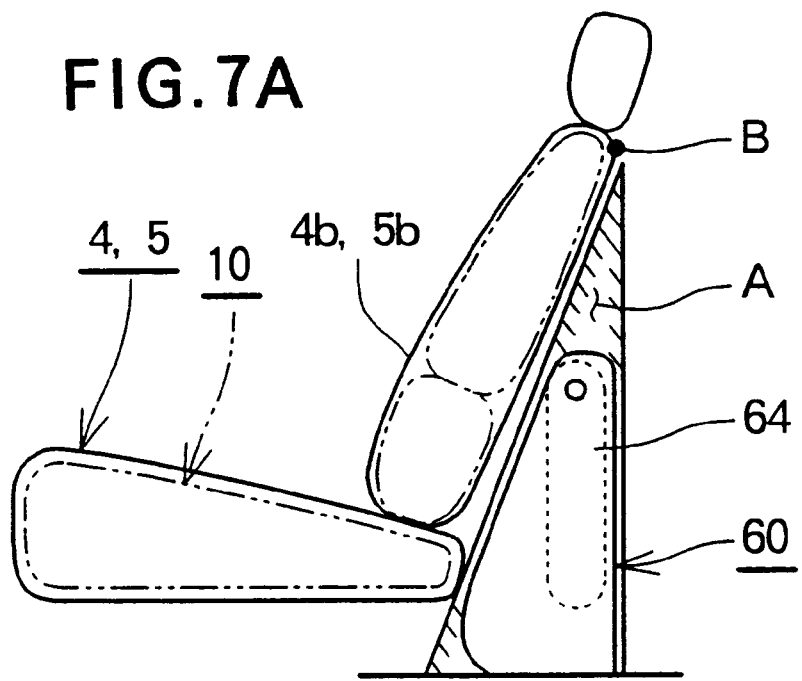
FIGS. 7A and 7B are views showing a manner in which the modified console box of FIG. 6 operates.
Figure 7B:
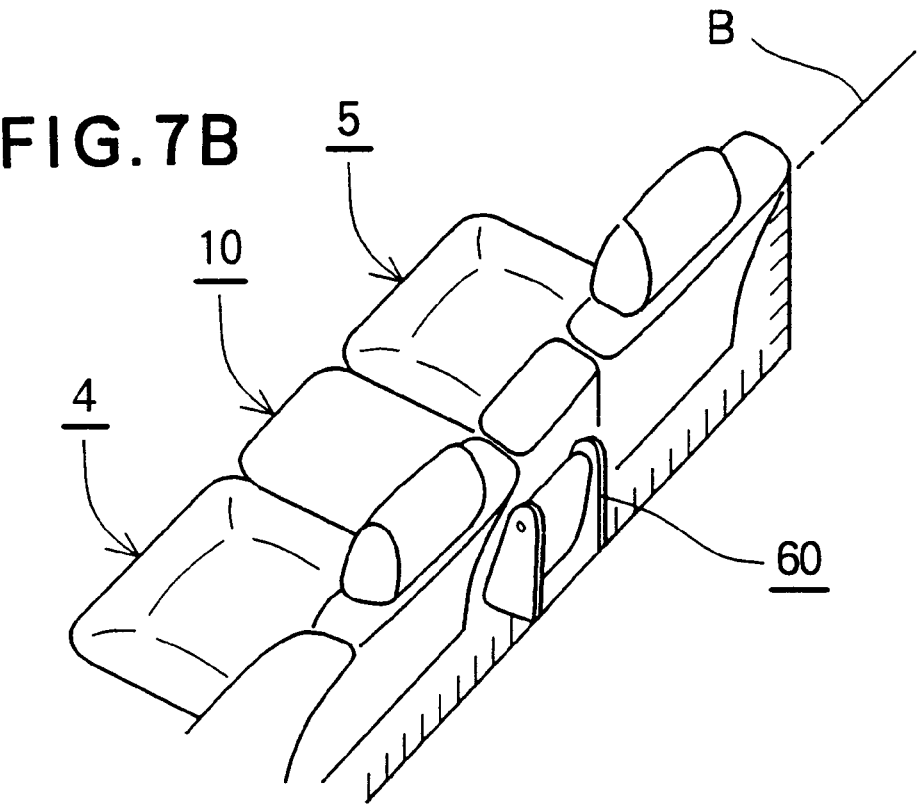

FIGS. 7A and 7B are views showing a manner in which the modified console box of FIG. 6 operates. Specifically, FIG. 7A is a side view showing the console box 60 as snugly placed in an area A right behind rearwardly inclined surfaces of back portions 4b and 5b of the rear left and right seats 4 and 5 when the seats 4 and 5 and center seat 10 are used as a bench seat. As shown in FIG. 7B, when the console box 60 is thus snugly placed in the area A, the rear end of the rear seat row constituted by the seats 4 and 5 and center seat 10 presents a substantially linear rear "ridge line B, thereby achieving an aesthetically improved outward appearance.

So far, the center seat 10 and the console box 40 with the pivotable armrest 44 have been described as movably arranged in a vehicle including a pair of front and rear seat rows. However, the present invention is not so limited; for example, the center seat 10 and the console box 40 may be movably arranged in a vehicle including three seat rows.

In summary, the present invention can provide a vehicle seat structure which permits a variety of seat combinations and improved convenience, dwelling comfort and space efficiency of the vehicle.

What is claimed is:

1. A seat structure for a vehicle comprising:

at least a pair of front and rear seat rows spaced apart from each other in a front-rear direction of the vehicle, each of said front and rear seat rows including left and right seats separated from each other transversely to a traveling direction of the vehicle, each of said left and right seats including a seatback having a rearwardly inclined rear surface;

at least one rail extending in the front-rear direction of the vehicle through said front and rear seat rows between said left and right seats;

a center seat movably mounted on said rail and slidable along said rail in the front-rear direction of the vehicle; and a console box provided rearwardly of said center seat and including a pivotally retractable armrest, said console box being movably mounted on said rail and slidable along said rail in the front-rear direction of the vehicle independently of said center seat, wherein said console box is designed to be receivable in an area which is defined right behind said rearwardly inclined rear surfaces of the respective seatbacks of said left and right seats of said rear seat row when viewed from a transverse direction of the vehicle.

2. A seat structure for a vehicle as recited in claim 1 wherein said console box includes a console door pivotably provided on a surface thereof facing said center seat to function as a pivotally retractable table.

3. A seat structure for a vehicle as recited in claim 2 wherein at least one cup holder is provided on an interior surface of said console door.

4. A seat structure for a vehicle as recited in claim 1 wherein a cup holder plate having cup holding means is incorporated in said armrest in such a manner that said cup holder plate is movable into and out of said armrest.

5. A seat structure for a vehicle as recited in claim 1 wherein said center seat includes a seat part, a lower back portion pivotable relative to said seat part in the front-rear direction, and an upper back portion pivotable relative to said lower back portion in the front-rear direction and being also capable of functioning as a pivotally retractable arm rest.

6. A seat structure for a vehicle as recited in claim 1 wherein said rail has a row of stopper holes arranged in the longitudinal direction of said rail at equal intervals, said center seat including a center-seat locking mechanism having a first stopper member formed with a pair of spaced first projections selectively fitted in two of said stopper holes in said rail to position and lock said center seat at a desired location on said rail, said first stopper member being movable to release said first projections from fitting engagement with said two stopper holes, said console box including a console locking mechanism having a second stopper member formed with a pair of spaced second projections selectively fitted in other two of said stopper holes in said rail to position and lock said console box at a desired location on said rail, said second stopper member being movable to release said second projection from fitting engagement with said other two stopper holes.

* * * * *